(12) United States Patent
Wallace

(10) Patent No.: US 8,890,885 B1
(45) Date of Patent: Nov. 18, 2014

(54) EFFICIENTLY COPYING AND BLENDING A SOURCE REGION INTO A TARGET REGION

(71) Applicant: Figma, Inc., Palo Alto, CA (US)

(72) Inventor: Evan Wallace, Palo Alto, CA (US)

(73) Assignee: Figma, Inc., Palo Alto, CA (US)

( * ) Notice: Subject to any disclaimer, the term of this patent is extended or adjusted under 35 U.S.C. 154(b) by 0 days.

(21) Appl. No.: 14/266,536

(22) Filed: Apr. 30, 2014

(51) Int. Cl.
   *G06G 5/00* (2006.01)
   *G09G 5/02* (2006.01)
   *H04N 1/60* (2006.01)
   *H04N 1/62* (2006.01)

(52) U.S. Cl.
   CPC .............. *H04N 1/62* (2013.01); *H04N 1/6008* (2013.01)
   USPC .......................................... 345/592; 345/629

(58) Field of Classification Search
   None
   See application file for complete search history.

(56) References Cited

U.S. PATENT DOCUMENTS

2008/0198175 A1* 8/2008 Sun et al. ............... 345/629
2011/0109646 A1* 5/2011 Ahmann et al. ........... 345/619

* cited by examiner

*Primary Examiner* — David Zarka
*Assistant Examiner* — Jason Pringle-Parker
(74) *Attorney, Agent, or Firm* — Hickman Palermo Truong Becker Bingham Wong LLP

(57) ABSTRACT

A method and apparatus for copying and blending a source region of an image into a target region of an image is presented herein. Specifically, a method is described for generating a difference color map from colors sampled in a source region and colors sampled just outside of a target region. The difference color map is applied to the source region stored. The results are stored in the target region. If no additional input has been received to modify the source region or the target region, then a larger difference color map may be generated and used to copy and blend the source region into the target region. A source region may appear to be better blended into the target region if a larger difference color map is used.

20 Claims, 9 Drawing Sheets
(1 of 9 Drawing Sheet(s) Filed in Color)

EFFICIENTLY COPYING AND BLENDING A SOURCE REGION INTO A TARGET REGION

FIELD OF THE INVENTION

The present invention relates to copying and blending a source region into a target region in an image.

BACKGROUND

Image editing applications allow users to copy a region, a "source" region, from one image into another region, a "target" region, of an image. The target region may or may not be from the same image that the source region is copied from. However, simply copying a region into another region, even if part of the same image, may look unnatural. This is because the human visual system is more sensitive to contrast than intensity values.

FIGS. 1A-1D illustrate copying a source region into a target region using conventional copying techniques. Specifically, FIG. 1A is an image containing a colored cube. FIG. 1B illustrates an image containing a plate. FIG. 1C illustrates an image resulting from simply copying a source region from FIG. 1A into a target region in FIG. 1B. As illustrated in FIG. 1C, the boundary between the source region and the target region causes the source region to appear to be artificially placed into FIG. 1C.

Various methods, such as poisson blending, have been created to blend a source region into a target region, so that the source region appears to be naturally occurring in the target region. FIG. 1D illustrates an image resulting from copying a source region from FIG. 1A into a target region in FIG. 1B using poisson blending.

Poisson blending, like many image processing methods, may be computationally expensive. A user may not be able to quickly view results while making adjustments to the source region or the target region.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

TERMS

A "computer" is one or more physical computers, virtual computers, and/or computing devices. As an example, a computer may be one or more desktop computers, laptop computers, mobile devices, cloud-based computers, and cloud-based cluster of computers, virtual computer instances or virtual computer elements such as virtual processors, storage and memory, and/or any other special-purpose computing devices. Any reference to "a computer" herein may mean one or more computers, unless expressly stated otherwise.

A "process" means a process, thread, and/or instance of a program or application implemented as software and executed by a computer and/or virtual computer instance.

A process "performing" a step or method means the process performing the step or method, or a process causing another process to perform the step or method.

A "user" is a user that uses an image editing application on a computer to update images.

A "color space" is a set of colors defined over a domain. For example, an RGB color space is a set of colors defined by a three-component domain: a red component, a green component, and a blue component. Also for example, a HSV color space is a set of colors defined by a three-component domain: a hue component, a saturation component, and a value component. Further, as an example, CMYK color space is a set of colors defined by a four-component domain: a cyan component, a magenta component, a yellow component, and a key (black) component.

A "color" is a particular color within a color space. For example, a color space may be denoted as a vector with angle brackets surrounding the color components, such as <A, B, C>, where A is the first component of the color, B is the second component of the color, and C is the third component of the color.

The "difference" between two colors, or a "difference color", is the component-wise difference between the two colors. Assume a first RGB color is defined as <X, Y, Z>, a second RGB color is defined as <A, B, C>, and a third RGB color is defined as <I, J, K>. The third RGB color is the difference color of the two other colors if <I, J, K> is equal to <X-A, Y-B, Z-C>. Typically, a color space is defined over components that are equal to or greater than zero. Thus, each component of a color defined in a color space is typically equal to or greater than zero. However, a difference color may have one or components that are negative. For example, if a first color is <0.1, 0.1, 0.1> and a second color is defined as <0.5, 0.4, 0.3>, then the difference between the first color and the second color, is <−0.4, −0.3, −0.2>.

A "blurred difference color" may be a weighted some of two or more difference colors. However, a blurred difference color may still be referred to herein as a difference color.

The "sum" of two colors is the component-wise sum of the two colors. For purposes of illustrating a clear example, assume a first RGB color is defined as <X, Y, Z>, a second RGB color is defined as <A, B, C>, and a third RGB color is defined as <I, J, K>. The third RGB color is the sum of the two other colors if <I, J, K> is equal to <X+A, Y+B, Z+C>.

The "weighted sum" of two or more colors is the component-wise weighted sum of two or more colors. For purposes of illustrating a clear example, assume a first RGB color is defined as <X, Y, Z>; a second RGB color is defined as <A, B, C>; a third RGB color is defined as <I, J, K>; a first weight, α, is a scalar value; and a second weight, β, is a scalar value. The third RGB color is the weighted sum of the two other colors if <I, J, K> is equal to <αX+βA, αY+βB, αZ+βC>.

A "point" may be a point in an image or display. A point may correspond to a particular datum, such as a color, in a data structure, and/or a particular pixel on a display. For example, a user may use a cursor to select a point on a screen. The location may correspond to a point in an image. The point may correspond with a color defined in a color space and stored as a data structure, such as an array, comprising a plurality of colors which define an image. Therefore, in an embodiment, a point is a pixel on a display, an index into a color map, and/or a color at a location in an image.

A "sample" or "sample color" at a point may be a color based on one or more colors assigned to, and/or near, the point. For example, a sample at a point may be the color assigned to, or nearest to, the point. A sample at a point may be a weighted sum of the colors in a region that includes the point. A sample at a point may be the component-wise median color of the colors in a region that includes the point. A sample at a point may be a color computed by applying one or more smoothing or sampling kernels to one or more colors in a region that includes the point.

"Sampling a point" means determining the sample color at the particular point on a display or in an image.

A "region" comprises an image or a contiguous area within an image.

BRIEF DESCRIPTION OF THE DRAWINGS

This patent or application file contains at least one drawing executed in color. Copies of this patent or patent application publication with color drawing(s) will be provided by the Office upon request and payment of the necessary fee. In the drawings.

Figure 1B:
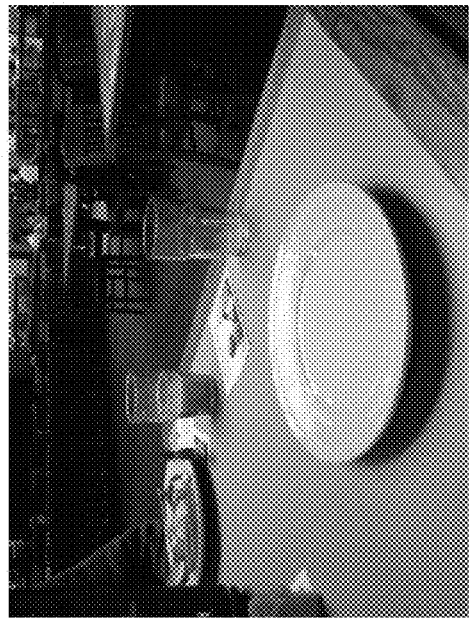
FIGS. 1A-1D illustrate copying a source region into a target region using conventional techniques.
Figure 1D:
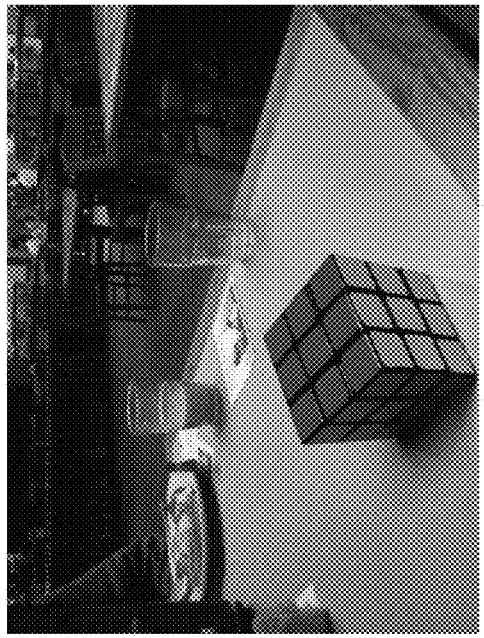
Figure 1A:
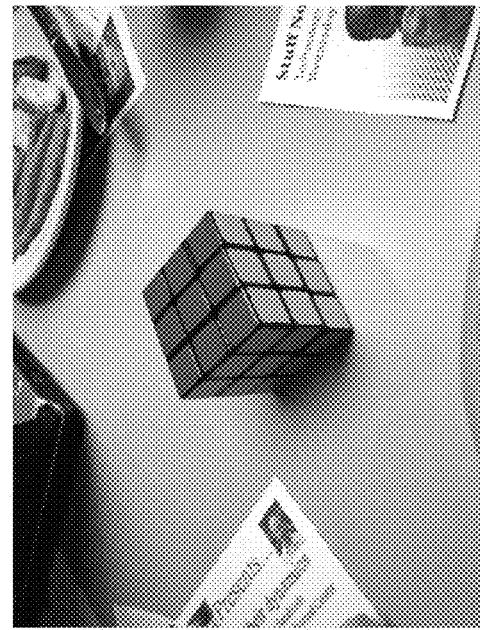
Figure 1C:
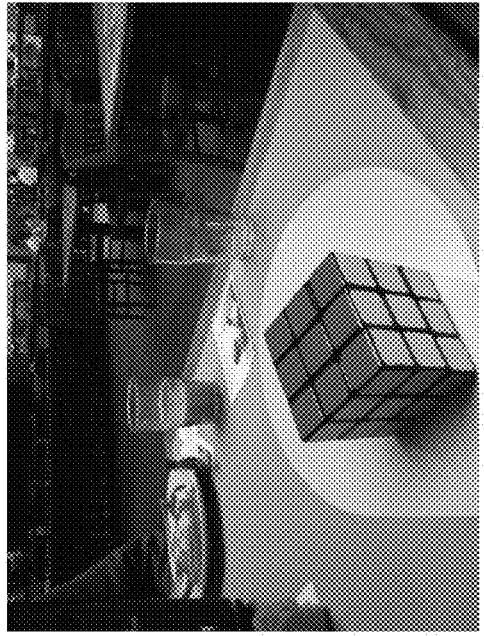

While each of the drawing figures illustrates a particular embodiment for purposes of illustrating a clear example, other embodiments may omit, add to, reorder, and/or modify any of the elements shown in the drawing figures. For purposes of illustrating a clear example, a figure may be described with reference to one or more other figures, but using the particular arrangement(s) illustrated in other figures are not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for efficiently blending a source region into a target region. A source region and a target region are selected. The source region comprises a source-center-point and the target region comprises a target-center-point. A set of "inner" points are selected in the source region, which are near but inside the border of the source region. Each inner point has the same, or nearly the same, distance from the source-center-point. A set of "outer" points are selected near but outside of the border of the target region. Each outer point has the same, or nearly the same, distance from the target region's target-center-point. Each point in the set of inner points corresponds to a point in the set of outer sample points. A set of difference colors are determined based on samples from the inner points and samples from the outer points. A color map is generated from the set of difference colors. The source region is copied and blended into the target region using the color map.

Figure 2:
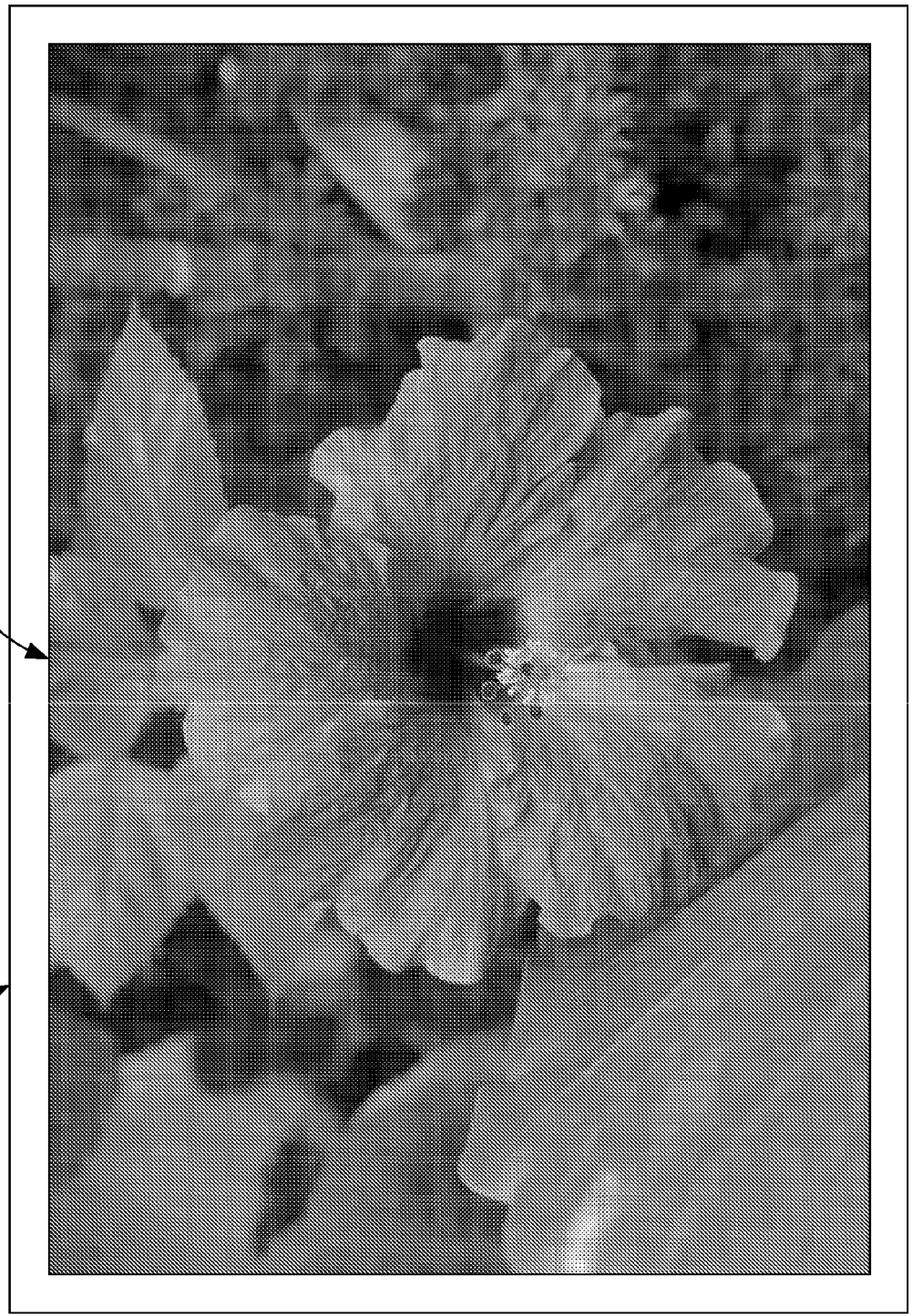
FIG. 2 illustrates an image displayed on a display, in an example embodiment.
Figure 5:
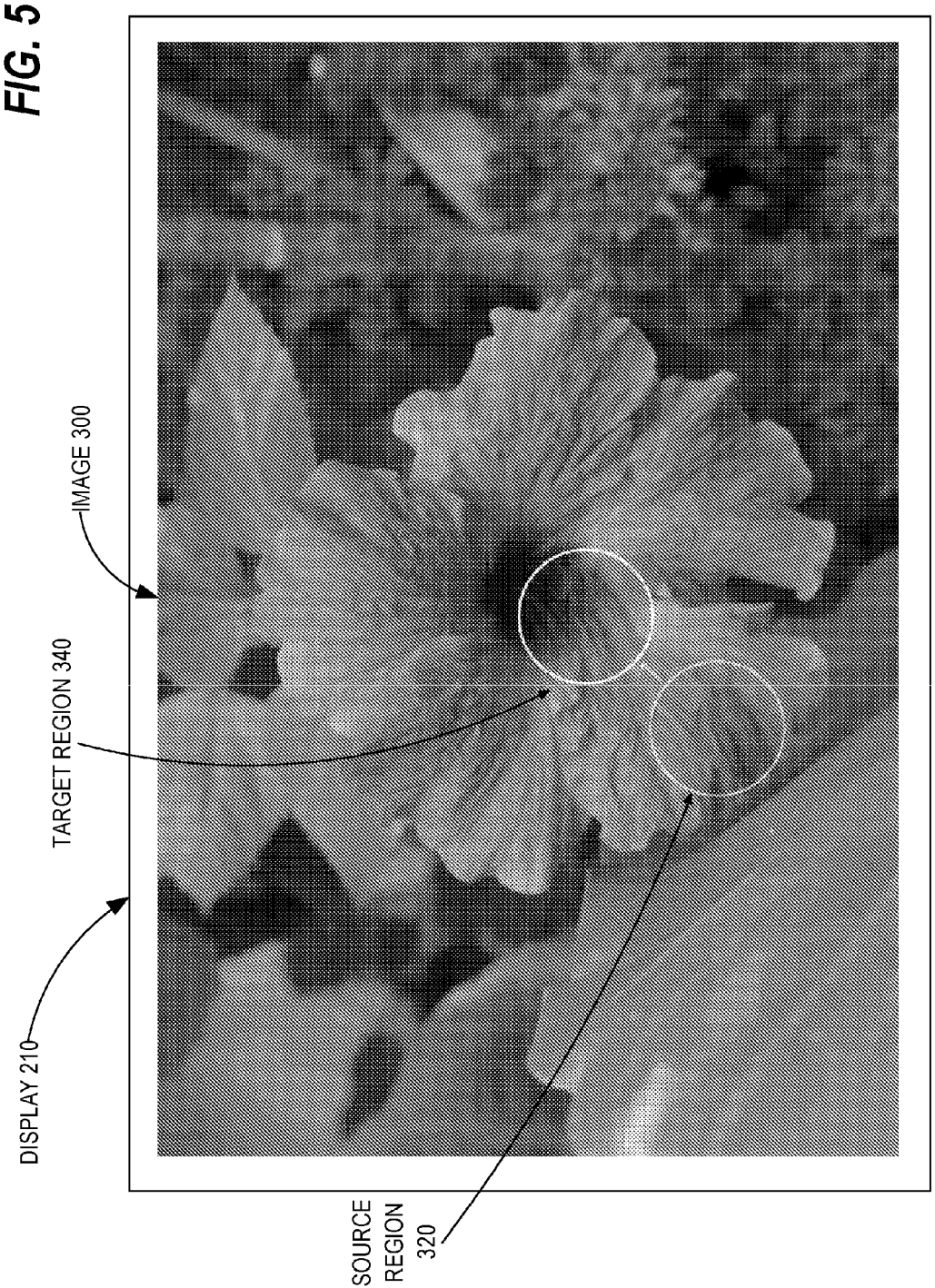
FIG. 5 illustrates a modified image that has a source region copied and blended into a target region, displayed on a display, in an example embodiment.

FIG. 2 illustrates an image displayed on a display, in an example embodiment. In FIG. 2, display 210 displays image 200, in an example embodiment. Based, on user input, defining a source region and a target region, a computer coupled to display 210 updates image 200 to generate image 300, which is illustrated in FIG. 5. FIG. 5 illustrates a modified image that has a source region copied and blended into a target region, displayed on a display, in an example embodiment.

Selecting a Source Region and a Target Region

Figure 7:
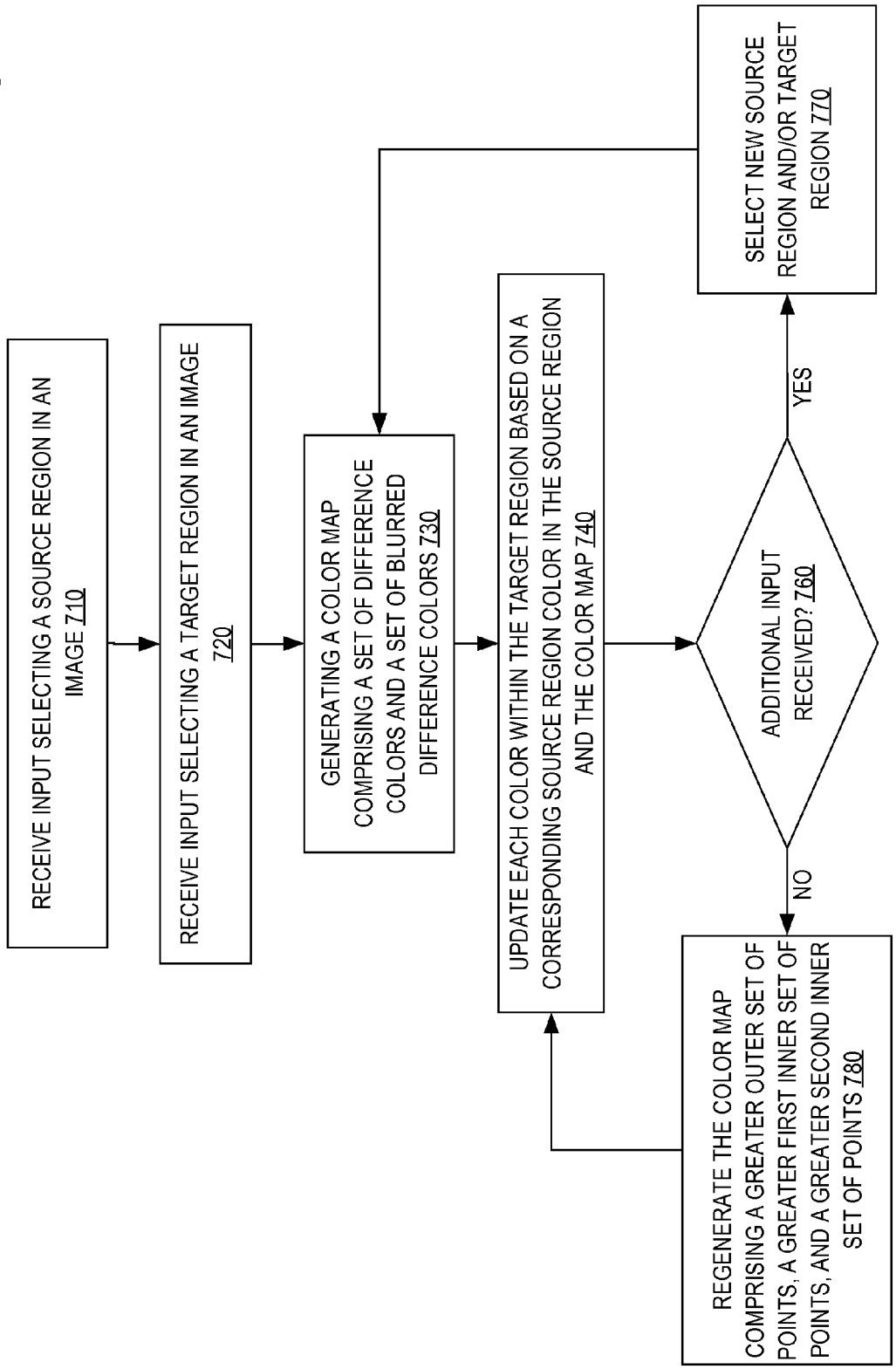
FIG. 7 illustrates a process for copying and blending a source region into a target region in real-time, and increasing the number of samples over time, in an example embodiment.

FIG. 7 illustrates a process for copying and blending a source region into a target region in real-time, and increasing the number of samples over time, in an example embodiment. The steps discussed in FIG. 7 may be performed by an image editing application, executed on a computer that presents the images, or causes the images to be presented on, a communicatively coupled display. The image editing application may perform one or more of the steps in response to, or in concert with, various user inputs.

Figure 3:
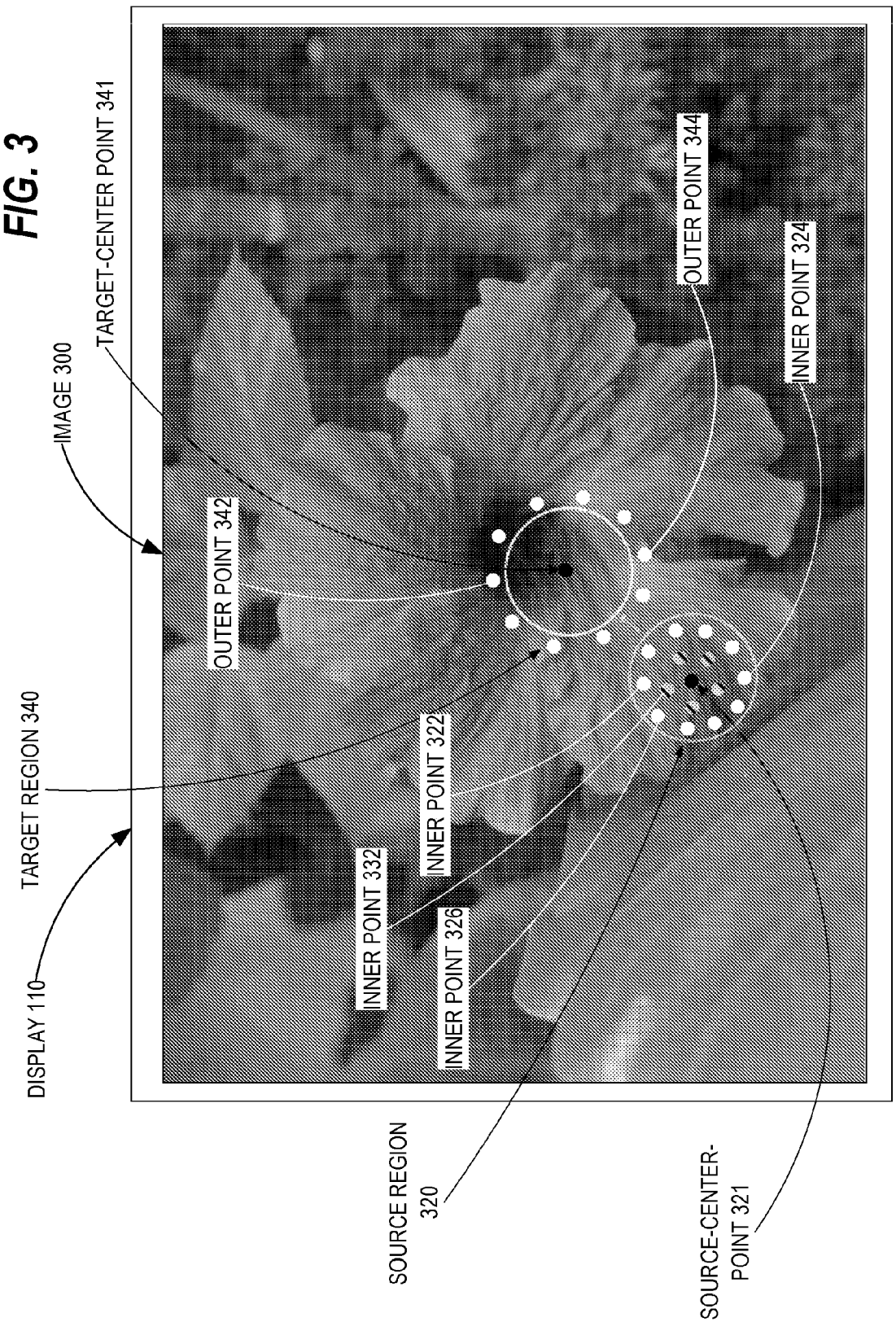
FIG. 3 and FIG. 4 illustrate samples and data structures used by the methods discussed in detail herein, to copy and blend the source region into the target region, in an example embodiment.
Figure 4:
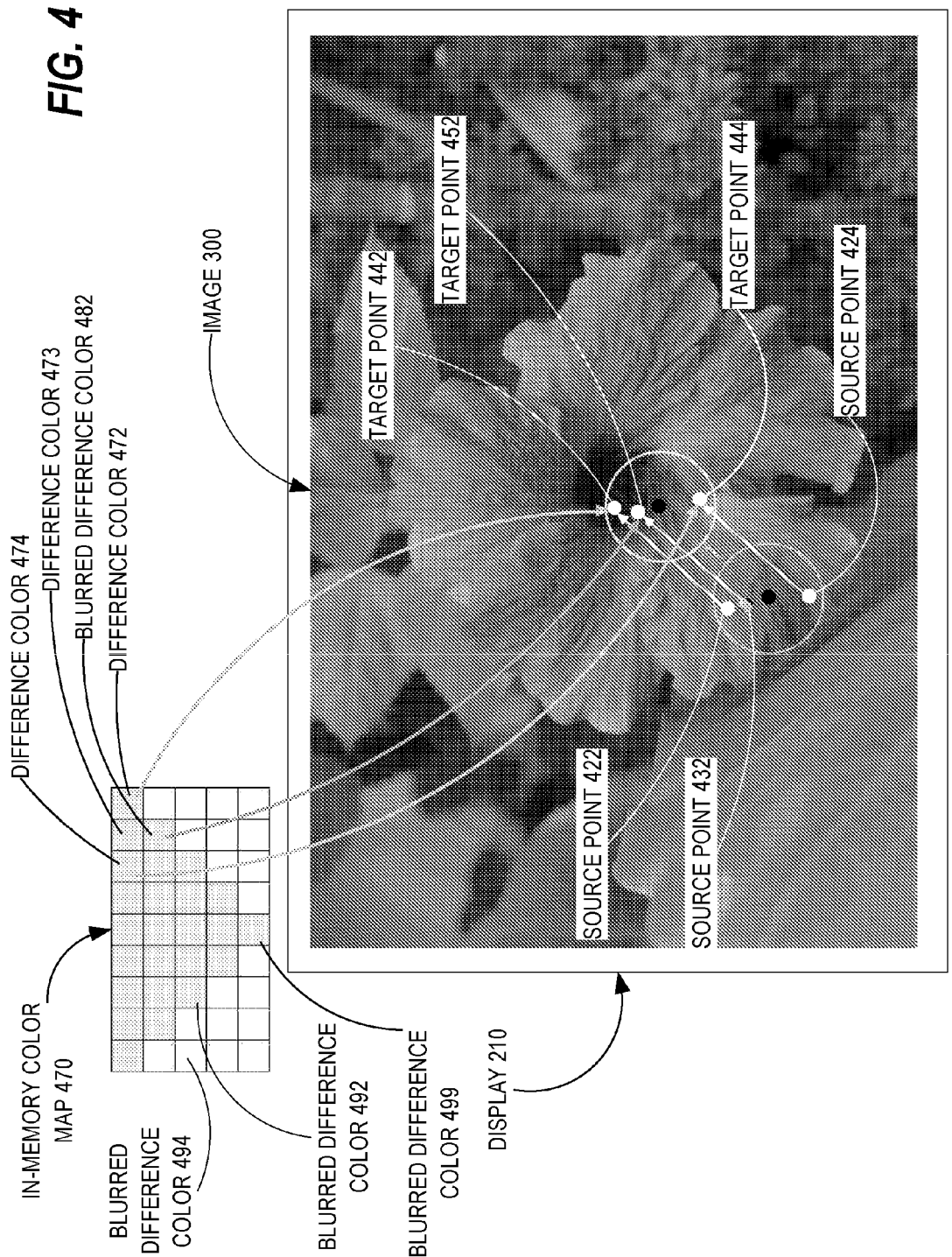

In step 710, an image editing application receives an input from a user selecting a source region of an image. For example, a user, using a cursor, may select a point on a display that corresponds to a point in an image currently being displayed. The image editing application may determine the corresponding point in the image to be the source-center-point of the source region. For purposes of illustrating a clear example, assume that a user, using a cursor, selects source-center-point 321 in image 300. In response, the image editing application may designate a default source region: source region 320. FIG. 3 and FIG. 4 illustrate samples and data structures used by the methods discussed in detail herein, to copy and blend the source region into the target region, in an example embodiment. In FIG. 3 and FIG. 4, source region 320 and target region 340 are each visually distinguished by being outlined with a white circle.

A user may move the source region. For example, in response to a user selecting the source region and moving the cursor on the display, the image editing application may move the source region in the image accordingly.

In step 720, the image editing application receives an input from a user selecting a target region. For example, a user, using a cursor, may select a point on display 210 that corresponds to a point in the image currently being displayed. The image editing application may determine the corresponding point in the image to be the target-center-point of the target region. For purposes of illustrating a clear example, assume that a user, using a cursor, selects target-center-point 341 in image 300. In response, the image editing application may designate a default target region: target region 340. In FIG. 3, target region 340 is visually distinguished by being outlined with a white circle. Additionally or alternatively, the boundaries of the target region may be automatically determined in the same image as the source region, without additional user input selecting a target-center-point for a target region.

For purposes of illustrating a clear example, the source region and the target region are in the same image. However, in other embodiments, the source region and the target region are in different images. The two different images may be displayed concurrently on display 210.

A user may cause the source and/or the target region to be resized. For example, in response to a user selecting the edge of the source region and dragging a cursor away from the center point, the image editing application may also resize the source region. In an embodiment, the source region and the target region are the same size. In response to resizing the source region, the image editing application may also resize the target region, or vice versa. The image editing application may maintain the position of the source-center-point of the source region when the source region is resized. Likewise, the image editing application may maintain the position of the target-center-point of the target region when the target region is resized.

Generating a Color Map Comprising a Set of Difference Colors

Figure 8:
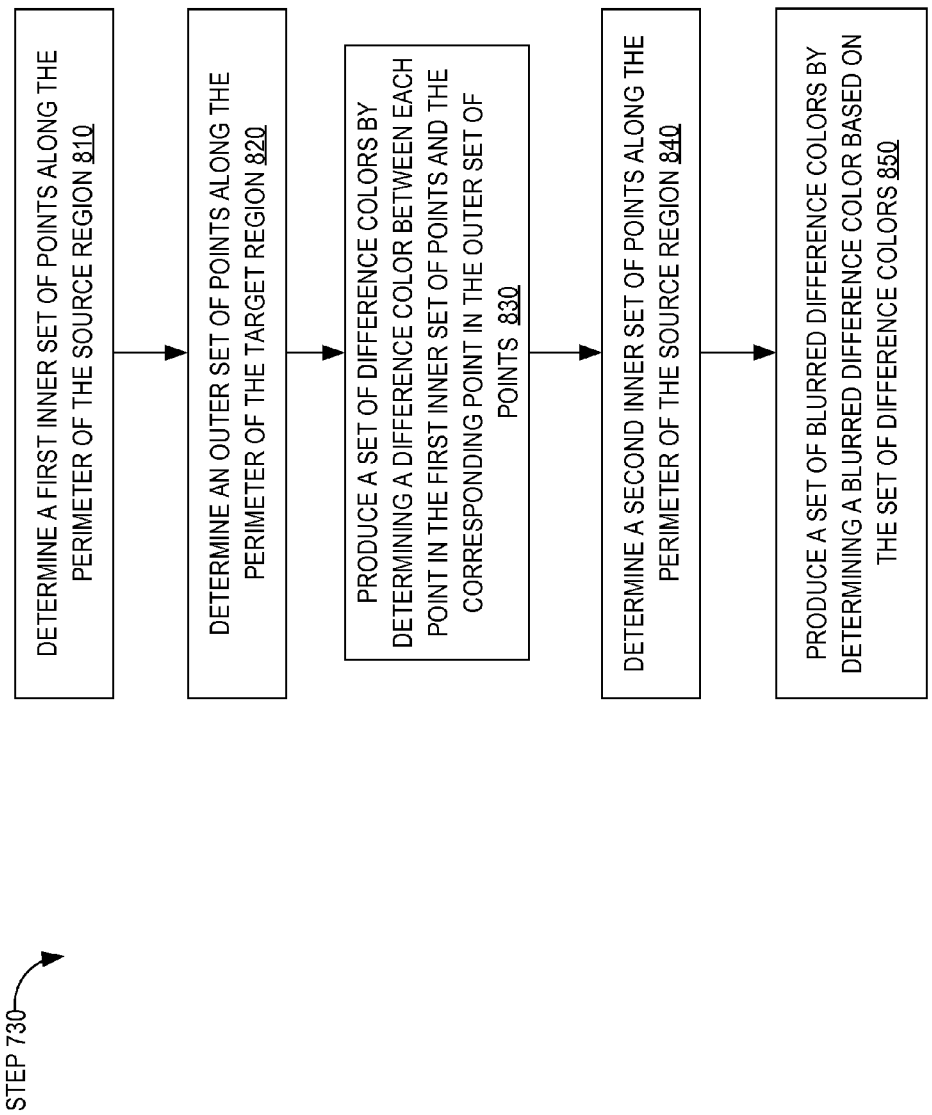
FIG. 8 illustrates a process for generating a difference color map, in an example embodiment.

In step 730, the image editing application generates a color map comprising a set of difference colors and a set of blurred difference colors. FIG. 8 illustrates a process for generating a difference color map, in an example embodiment.

Selecting a First Set of Inner Points

In step 810, the image editing application determines a first inner set of points along the perimeter of the source region. For example, the image editing application may select equally spaced points along the inside of the perimeter of source region 320, which are illustrated as white dots in source region 320 in FIG. 3. Inner point 322, inner point 324, and inner point 326 identify particular points in the first inner set of points. Each point in the first inner set of points may have the same distance from the source region's source-center-point, source-center-point 321. If the source region is a circle, then the first inner set of points may have the same distance from source-center-point 321.

Selecting a Set of Outer Points

In step 820, the image editing application determines an outer set of points along the perimeter of the target region. For example, the image editing application may select equally spaced points along the outside of the perimeter of target region 340, which are illustrated as white dots just outside target region 340 in FIG. 3. Outer point 342 and outer point 344 identify particular points in the outer set of points. Each point in the outer set of points may have the same distance from the target region's target-center-point, target-center-point 341. If the target region is a circle, then the outer set of points may have the same distance from target-center-point 341.

Each point in the first inner set of points corresponds with a point in the outer set of points, and vice versa. For example, inner point 322 corresponds with outer point 342, and inner point 324 corresponds with outer point 344.

Generating an in-Memory Color Map

In step 830, the image editing application produces a set of difference colors by determining a difference color between a color sampled at each point in the first inner set of points and the color sampled at the corresponding point in the outer set of points. For example, the image editing application may sample the image at the inner point 322 and corresponding outer point 342. The image editing application may compute the difference color between the color sampled at inner point 322 and the color sampled at outer point 342, such that the sum of the color sampled at inner point 322 and the difference color is equal to the color sampled at outer point 342.

The difference colors are stored in a color map. FIG. 4 illustrates an in-memory color map 470, which stores color values in a grid or two-dimensional array, similar to an image. Each element in in-memory color map 470 that is assigned a color is shaded in yellow. Each element in in-memory color map 470 that is not assigned a color is shaded in white. In-memory color map 470 may store the difference colors determined from each pair of inner and outer points. For example, difference color 472 may be the difference color between inner point 322 and outer point 342, such that the sum of inner point 322 and difference color 472 is equal to outer color 342. Also for example, difference color 374 is the difference color between inner point 324 and outer point 344, such that the sum of inner point 324 and difference color 474 is equal to outer color 344. Each difference may be stored along one axis of the color map. For example, each of the difference colors that correspond to the first set of inner points, including difference color 472 and difference color 474, are stored along the top row of in-memory color map 470.

Additional difference colors may be computed by computing weighted sums of other difference colors. For example, difference color 473 may be a weighted sum of difference color 472 and difference color 474.

In step 840, the image editing application determines a second inner set of points along the perimeter of the source region. For example, the image editing application may select equally spaced points along the inside of the perimeter of source region 320, which are illustrated as gray striped dots in source region 320. Inner point 332 identifies a particular point in the second inner set of points. Each point in the second inner set of points may have the same distance from the source region's source-center-point, source-center-point 321.

Each point in the second inner set of points may be within a region defined by, and/or based on, the first inner set of points. The region defined by, and/or based on, the first inner set of points may include the source-center-point. For example, a convex hull may be defined by the first inner set of points, which includes source-center-point 321, and each point in the second inner set of points may be within the convex hull. Additionally or alternatively, at least one point in the second set of inner points is closer to source-center-point 321 than at least one point in the first set of inner points. Additionally or alternatively, the distance from source-center-point 321 to each point in the second inner set of points is less than the distance from the source-center-point 321 to each point in the first inner set of points. The second inner set of points may have fewer points than the first inner set of points, as illustrated in FIG. 3.

In step 850, the image editing application produces a set of blurred difference colors by determining a blurred difference color based on the set of difference colors. Each blurred difference color in the set of blurred difference colors is associated with an inner point. For example, blurred difference color 482 is associated with inner point 332, and is a weighted sum of two or more difference colors, such as difference color 472 and difference color 474. The weights applied to each color may be based on the distance between the inner point that the blurred difference color corresponds to and the inner points the difference colors correspond to.

For purposes of illustrating a clear example, assume the following:
  (1) difference color 472 is <A, B, C>;
  (2) difference color 474 is <X, Y, Z>;
  (3) the distance between inner point 332 and inner point 322 and the distance between inner point 332 and inner point 324 is measured using a Euclidian distance metric; and (4) inner point 322 and inner point 324 are equally distant from inner point 332.

Thus, blurred difference color 382 is <I, J, K>, which is equal to <αA+βX, αB+βY, αC+βZ>, where α is 0.5 and β is 0.5. If the distance between inner point 322 and inner point 332 was less than the distance between inner point 324 and inner point 332, then α may be greater than β.

Each blurred difference may be stored along the same axis of the color map, but in a different row than the difference colors. For example, blurred difference color 482 is in a different row than difference color 472 and difference color 474.

The image editing application may repeat step 840 and step 850 to determine additional sets of inner points and further blurred difference colors, such as blurred difference color 492. For example, blurred difference color 492 may be associated with an inner point in a third set of inner points, which are not illustrated in FIG. 3. Blurred difference color 492 may be a weighted sum of two or more blurred difference colors associated with two or more inner points from the second set of inner points.

In-memory color map 470 is parameterized based on a distance from the source region's source-center-point, source-center-point 321, and an angle from some axis, such as one of the axes of the source image. Accordingly, difference color 472, difference color 473, and difference color 474 correspond to points further away from source-center-point 321 than the point(s) that correspond to blurred difference color 482. Similarly, blurred difference color 482 corresponds to a point that is further away from source-center-point 321 than the point(s) that correspond to blurred difference color 492 and blurred difference color 494. Blurred difference color 499 may correspond to source-center-point 321.

Each additional set of inner points may have fewer inner points than a previous set of inner points. Thus, each element in in-memory color may 470 need not be completely populated as illustrated in in-memory color map 470.

Each point in each additional set of inner points may be within a region defined by, and/or based on, the previous set of inner points. For example, each point in each additional set of inner points may be within a convex hull defined by, and/or based on, a previous set of inner points. Additionally or alternatively, each point in each additional set of inner points may have a shorter distance to the center point than the previous set of inner points.

Additionally or alternatively, the color map is a sparsely populated color map. However, the image editing application may compute a color for an element that is not assigned a color. For example, the image editing application may compute a sum of colors assigned to one or more elements in the color map near the element that is not assigned a color.

Additionally or alternatively, the points that are not populated in in-memory color map 470 are assigned the value of the nearest populated color in the same row. For example, blurred difference color 494 may be set to be the same as blurred difference color 492.

In an embodiment, the inner points are determined using a pre-defined mesh. Each vertex in the mesh may be an inner point. The inner points with the same, or nearly the same, distance to the center point may be in the same inner set of points. Weights may be assigned to each vertex in the mesh. The image editing application may use the weights to compute a blurred difference color that corresponds to the vertex. For purposes of illustrating a clear example, assume inner point 322, inner point 324, and inner point 332 are vertices in a mesh. Inner point 332 may be assigned two weights. The first weight may correspond to a vertex, such as inner point 322. The second weight may correspond to a different vertex, such as inner point 324. The difference color that corresponds to inner point 332 may be computed using the difference colors that correspond and inner point 322 and inner point 324, and the first weight and the second weight, respectively.

Updating the Target Region Based on the Source Region and the Color Map

Returning now to FIG. 7, in step 740, the image editing application updates a color at each point within the target region based on a color corresponding to a point from the source region and the color map. For purposes of illustrating a clear example, assume the following:

(1) target point 442 corresponds to source point 422;
(2) source point 422 corresponds difference color 472;
(3) target point 444 corresponds to source point 424;
(4) source point 424 corresponds to difference color 474;
(5) target point 452 corresponds to source point 432; and
(6) source point 432 corresponds to blurred difference color 482.

The image editing application computes a color for target point 442 by taking the sum of a color sampled at source point 422 and difference color 472. In an embodiment, the domain of each component in a color space is capped between zero and one. Thus, if a component of a target color is greater than one, the component may be set to one. If a component of a target color is less than zero, then the component may be set to zero. The domain of each component in a different color space may be capped a across different range, such as between zero and 355.

Continuing with the above example, the image editing application computes a color for target point 444 by taking the sum of a color sampled at source point 424 and difference color 474. The image editing application computes a color for target point 452 by taking the sum of a color sampled at source point 432 and blurred difference color 482. The image editing application may cap the components of each computed color as discussed above.

A data structure may map each target point with a source point. Additionally or alternatively, a method may be defined that maps a target point to a source point, based on the center point for the target region and the center point for the source region.

A data structure may map each source point, and/or target point, with a difference color in in-memory color map 470. Additionally or alternatively, a method may be defined that maps a source point to a difference color, based on a distance from the source region's source-center-point, source-center-point 321, and an angle from some axis, such as one of the axes of the source image. Additionally or alternatively, the method may map a source point to a difference point in in-memory color map 470.

Using a Graphic Processing Unit

One or more graphics processing units ("GPUs") may perform the methods discussed herein. A GPU is a specialized processor that may perform the same operations on multiple vectors concurrently. Because colors in a color space can be represented as vectors, as described herein, a GPU may perform the methods discussed on multiple colors in the source region, target region, and/or color map concurrently. Thus, in an embodiment, the methods discussed herein may be performed faster on a GPU than a CPU.

For purposes of illustrating a clear example, assume in-memory color map 470 is copied into a first shader buffer and the colors in the source region are copied into a second shader buffer. A shader buffer may be a special buffer stored on the same card as a GPU, which allows the GPU faster access to the data stored in the buffer.

The GPU may add the in-memory color map stored in the first shader buffer to the source region stored in the second shader buffer to produce a target region. The GPU may copy the target region into main memory to be added to the image with the target region. Additionally or alternatively, the GPU may copy the target region into the target image.

In an embodiment, the GPU transforms in-memory color map 470, which is originally parameterized by radius and angle, into image space, which is parameterized by height and width, based on the size of the source region copied into the second shader buffer. The GPU may add the transformed in-memory color map stored in the first shader buffer to the source region stored in the second shader buffer to produce a target region.

Refining the Target Region

The image editing application may compute the blended target region faster by generating a smaller in-memory color map and/or generating an in-memory color map from fewer inner points and fewer outer points. For convenience of expression, a "smaller" in-memory color map means an in-memory color map that has fewer difference colors, and/or is generated from fewer inner points and/or fewer outer points, than another in-memory color map.

A target region generated from a smaller in-memory color map may not appear to be as well blended as a target region generated from a larger in-memory color map. To allow a user to modify the source region and target region in real-time the image editing application may generate an initial in-memory color map. After a user stops modifying the source region and/or target region, the image editing application may make a larger in-memory color map and generate a better blended target region.

In step 760, the image editing application determines if additional input has been received that modifies the source region and/or the target region. If so, then the process passes to step 770; otherwise, the process passes to step 780.

In step 770, the image editing application selects a new source and/or target region based on the input. The process passes to step 730 and generates a new target region.

In step 780, the image editing application generates a larger color map that has more difference colors, and/or is generated from more inner points and/or more outer points, than the previously generated in-memory color map. The process passes to step 740 and the image editing application generates a new target region using the larger in-memory color map.

In an embodiment, the image editing application uses a more densely populated mesh with more vertices than the previous mesh. Accordingly, the image editing application generates a larger color map, which has more difference colors than the previously generated color map.

Copying and/or Touching Up Portions of an Image

FIG. 5 illustrates image 300, which is displayed on display 210, wherein source region 320 is copied and blended into target region 340 using one or more of the methods and data structures discussed herein.

Figure 6:
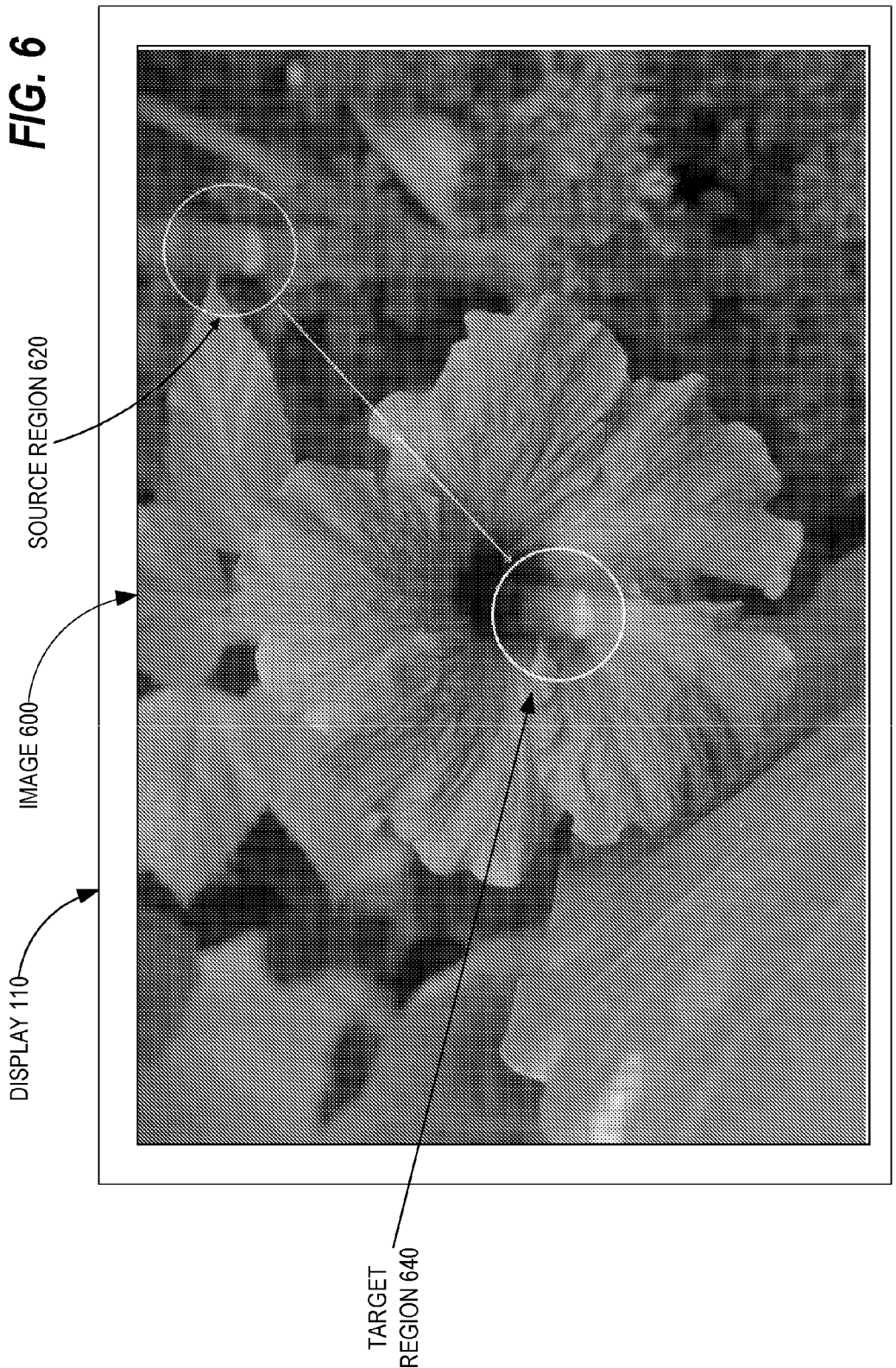
FIG. 6 is illustrates an image with a source region and a target region that covers a pistil and stamen portion of a flower, in an example embodiment.

The methods discussed above may be used to touch up photos. FIG. 6 is illustrates an image with a source region and a target region that covers a pistil and stamen portion of a flower, in an example embodiment. In FIG. 6, image 600 is displayed on display 210. Image 600 is a modified image, generated using one or more of the methods discussed herein on image 200: the image editing application copies and blends source region 620 into target region 640. In an embodiment, one or more of the methods may be used to cover up acne and/or other blemishes in an image.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
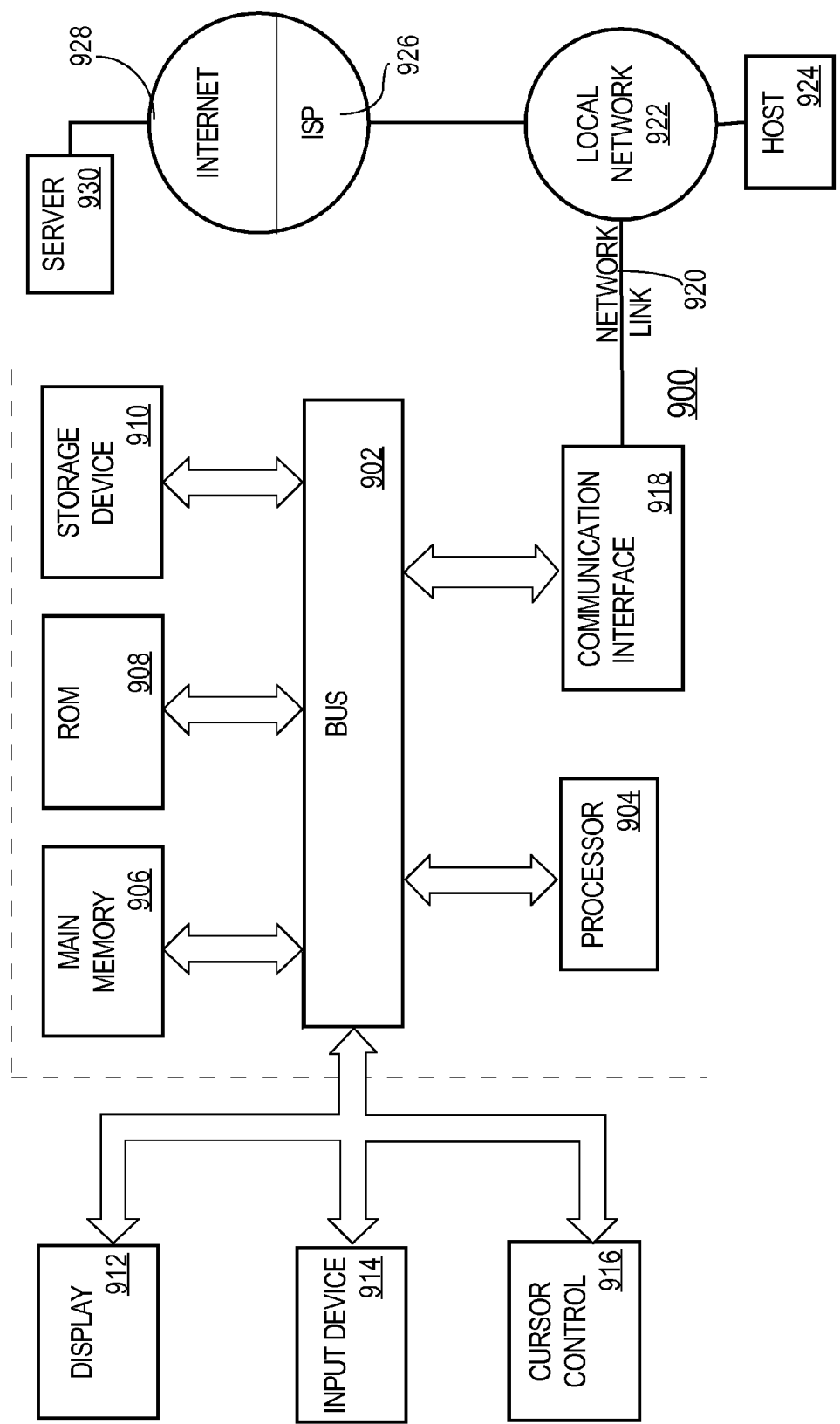
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    determining a first inner set of points along an inner perimeter of a source region within a first image, wherein the source region includes a source-center-point;
    for each point in the first inner set of points, assigning an inner color to the point based on one or more inner colors in the first image at the point;
    determining an outer set of points along an outer perimeter of a target region within a second image;
    for each point in the outer set of points, assigning an outer color to the point based on one or more outer colors in the second image at the point;
    wherein each point in the first inner set of points has a corresponding point in the outer set of points;
    producing a set of difference colors by determining a difference color between each point in the first inner set of points and the corresponding point in the outer set of points;
    determining a second inner set of points along the inner perimeter, wherein each point in the second inner set of points is within a region based on the first inner set of points;
    producing a set of blurred difference colors by determining a blurred difference color based, at least in part, on the set of difference colors;
    wherein each point in the second inner set of points corresponds to a particular blurred difference color in the set of blurred difference colors;

generating a color map comprising the set of difference colors and the set of blurred difference colors;

updating each color within the target region based, at least in part, on a corresponding source region color in the source region and the color map;

wherein the method is performed by one or more computing devices.

2. The method of claim 1 comprising determining the second inner set of points along the inner perimeter, wherein each point in the second inner set of points has a shorter distance to the source-center-point than each point in the first inner set of points.

3. The method of claim 1 comprising:

computing one or more additional blurred difference colors based, at least in part, on the set of blurred difference colors;

storing the one or more additional blurred difference colors in the color map.

4. The method of claim 1, wherein:

the source region is a first circle with a first radius;

the target region is a second circle with a second radius;

the first radius is equal to the second radius.

5. The method of claim 1, wherein the first image and the second image is a same image.

6. The method of claim 1 comprising storing the color map in a contiguous buffer in a memory.

7. The method of claim 1 comprising:

storing the color map in a memory is located on a card comprising a specialized graphics-processing unit;

storing the first image in the memory on the card;

storing the second image in the memory on the card;

performing the steps on the specialized graphics-processing unit.

8. The method of claim 1 comprising:

storing the color map in a memory is located on a card comprising a specialized graphics-processing unit;

storing the first image in a shader buffer in the memory on the card;

storing the second image in the shader buffer in the memory on the card;

storing the color map in the shader buffer in the memory on the card;

performing the steps on the specialized graphics-processing unit executing shader instructions.

9. The method of claim 1 comprising:

determining a particular amount of time has elapsed since the source region, the target region, the first image, and the second image has changed;

adding one or more first additional points to the first inner set of points;

adding one or more second additional points to the second inner set of points;

regenerating the color map based, at least in part, on the one or more first additional points and the one or more second additional points, to produce a new color map;

updating each color within the target region based, at least in part, on the corresponding source region color in the source region and the new color map.

10. The method of claim 1, wherein each point in the first inner set of points corresponds with a particular color stored in the first image within the source region.

11. One or more non-transitory computer-readable media storing instructions which, when executed by one or more processors, cause performance of a method comprising:

determining a first inner set of points along an inner perimeter of a source region within a first image, wherein the source region includes a source-center-point;

for each point in the first inner set of points, assigning an inner color to the point based on one or more inner colors in the first image at the point;

determining an outer set of points along an outer perimeter of a target region within a second image;

for each point in the outer set of points, assigning an outer color to the point based on one or more outer colors in the second image at the point;

wherein each point in the first inner set of points has a corresponding point in the outer set of points;

producing a set of difference colors by determining a difference color between each point in the first inner set of points and the corresponding point in the outer set of points;

determining a second inner set of points along the inner perimeter, wherein each point in the second inner set of points is within a region based on the first inner set of points;

producing a set of blurred difference colors by determining a blurred difference color based, at least in part, on the set of difference colors;

wherein each point in the second inner set of points corresponds to a particular blurred difference color in the set of blurred difference colors;

generating a color map comprising the set of difference colors and the set of blurred difference colors;

updating each color within the target region based, at least in part, on a corresponding source region color in the source region and the color map.

12. The one or more non-transitory computer-readable media of claim 11, the method further comprising determining the second inner set of points along the inner perimeter, wherein each point in the second inner set of points has a shorter distance to the source-center-point than each point in the first inner set of points.

13. The one or more non-transitory computer-readable media of claim 11, the method further comprising:

computing one or more additional blurred difference colors based, at least in part, on the set of blurred difference colors;

storing the one or more additional blurred difference colors in the color map.

14. The one or more non-transitory computer-readable media of claim 11, wherein:

the source region is a first circle with a first radius;

the target region is a second circle with a second radius;

the first radius is equal to the second radius.

15. The one or more non-transitory computer-readable media of claim 11, wherein the first image and the second image is a same image.

16. The one or more non-transitory computer-readable media of claim 11, the method further comprising storing the color map in a contiguous buffer in a memory.

17. The one or more non-transitory computer-readable media of claim 11, the method further comprising:

storing the color map in a memory is located on a card comprising a specialized graphics-processing unit;

storing the first image in the memory on the card;

storing the second image in the memory on the card;

performing the steps on the specialized graphics-processing unit.

18. The one or more non-transitory computer-readable media of claim 11, the method further comprising:

storing the color map in a memory is located on a card comprising a specialized graphics-processing unit;

storing the first image in a shader buffer in the memory on the card;

storing the second image in the shader buffer in the memory on the card;

storing the color map in the shader buffer in the memory on the card;

performing the steps on the specialized graphics-processing unit executing shader instructions.

19. The one or more non-transitory computer-readable media of claim 11, the method further comprising: determining a particular amount of time has elapsed since the source region, the target region, the first image, and the second image has changed;

adding one or more first additional points to the first inner set of points;

adding one or more second additional points to the second inner set of points;

regenerating the color map based, at least in part, on the one or more first additional points and the one or more second additional points, to produce a new color map;

updating each color within the target region based, at least in part, on the corresponding source region color in the source region and the new color map.

20. The one or more non-transitory computer-readable media of claim 11, wherein each point in the first inner set of points corresponds with a particular color stored in the first image within the source region.

* * * * *